Aug. 17, 1954 H. W. DIETERT 2,686,425
PERMEAMETER
Filed Sept. 2, 1952 2 Sheets-Sheet 1
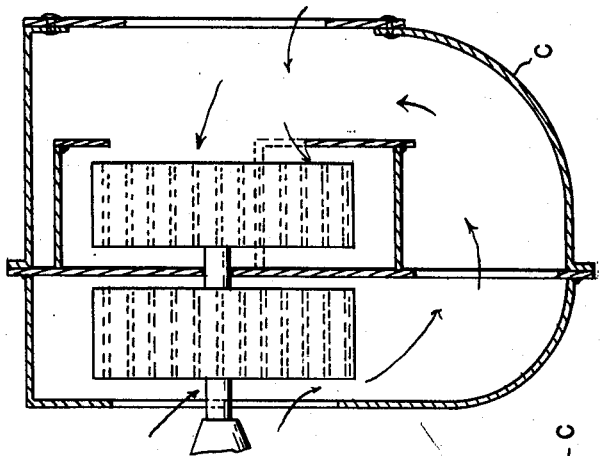
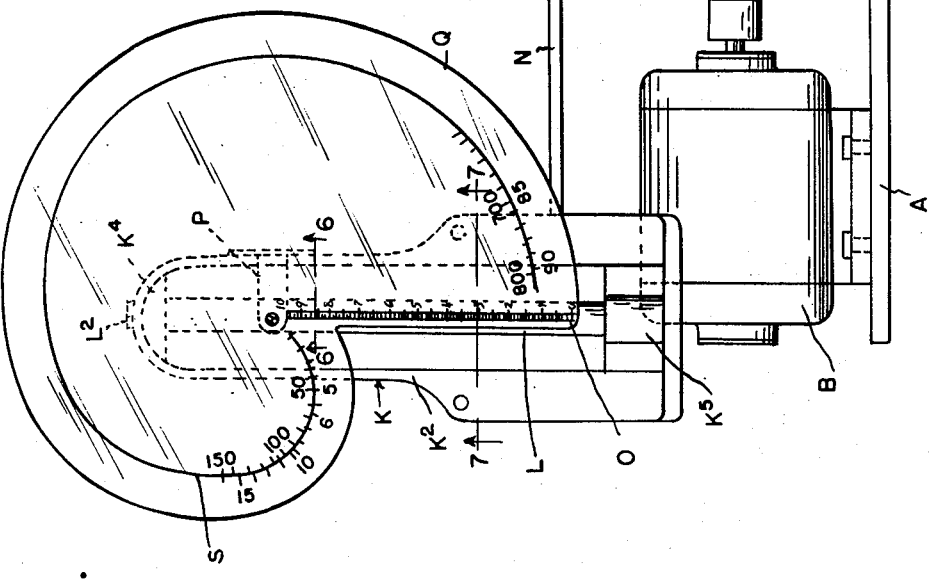
INVENTOR.
HARRY W. DIETERT
BY
ATTORNEYS Aug. 17, 1954
H. W. DIETERT
2,686,425
PERMEAMETER
Filed Sept. 2, 1952
2 Sheets-Sheet 2
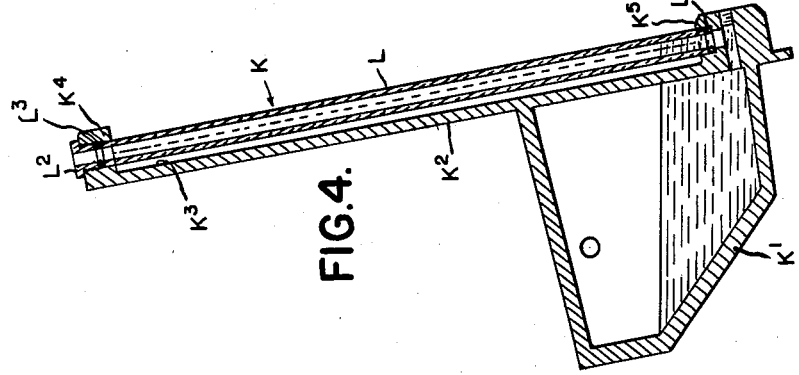
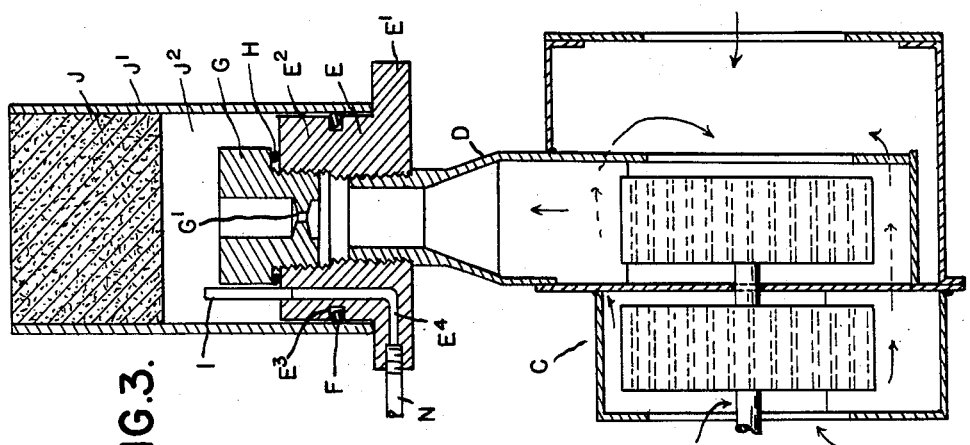
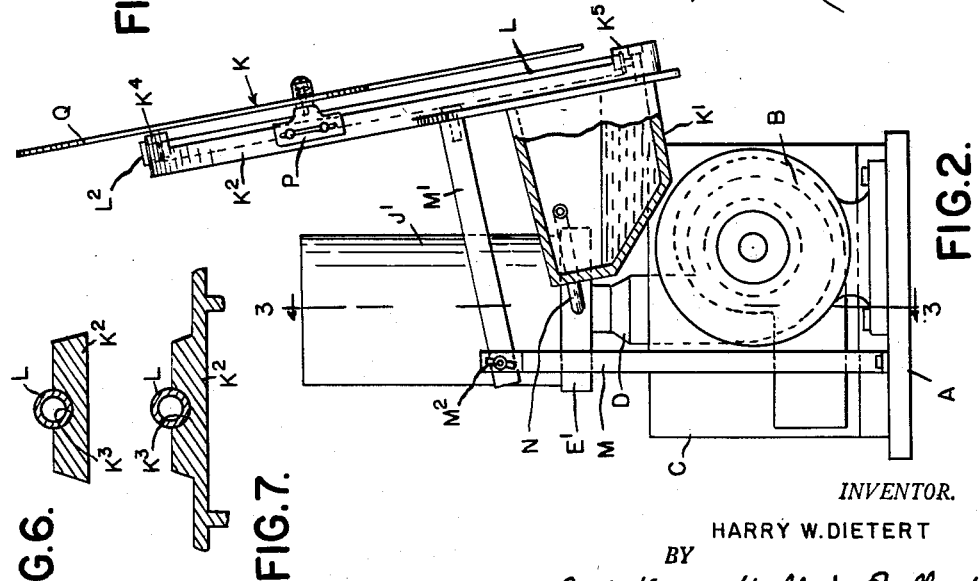
INVENTOR.
HARRY W. DIETERT
BY
Whittemore Hulbert & Belknap
ATTORNEYS Patented Aug. 17, 1954

2,686,425

UNITED STATES PATENT OFFICE 2,686,425

PERMEAMETER

Harry W. Dietert, Detroit, Mich., assignor to Harry W. Dietert Company, Detroit, Mich., a corporation of Michigan Application September 2, 1952, Serial No. 307,484

3 Claims. (Cl. 73—38)

The invention relates to means for measuring the permeability of bodies to the flow of gases therethrough.

More particularly, the invention relates to a means for testing the permeability of molds, cores and generally molding materials used in foundries.

It is the object of the invention to obtain a simple portable instrument which can be manufactured at relatively low cost and with which the desired measurements may be quickly and easily performed. To this end the invention consists in the construction as hereinafter set forth.

In the drawings:

Fig. 1 is a front elevation of the permeameter;

Fig. 2 is an end elevation partly in section;

Fig. 3 is a vertical section substantially on line 3—3, Fig. 2;

Fig. 4 is a section through the manometer;

Fig. 5 is a horizontal section through the fan housing; and

Figs. 6 and 7 are cross sections respectively on lines 6—6 and 7—7, Fig. 1.

As illustrated, A is a base on which is mounted a small power electric motor B and a fan or air propeller C connected to be actuated thereby. D is an air discharge tube projecting upward from the fan housing and E is a head or coupling means mounted thereon for engaging the tubes containing the samples to be tested. This coupling means as specifically shown, comprises a head having a base flange $E^1$ and an upwardly extending cylindrical portion $E^2$ of smaller diameter adapted to fit within the test tubes. A sealing means, such as a gasket or O-ring F, engages an annular groove $E^3$ in the portion $E^2$ for forming an air tight joint with the test tube when sleeved thereon. The head E is centrally apertured and internally threaded at its upper end to receive an exchangeable metering member G. This has a channel therethrough with a restricted portion $G^1$ therein which governs the rate of flow of air and is relatively unaffected by variations in the velocity of the fan. To avoid corrosion, which would alter the diameter of the orifice, the latter is preferably gold lined. A plurality of these exchangeable metering members G may be provided, each producing a particular rate of air flow. To avoid any danger of leakage of air through the threaded joint between the members G and E, a sealing means H, such as an O-ring, is placed between a shoulder on the member G and the head E. The head E is further provided with a channel $E^4$ extending through the base flange $E^1$ and upward through the portion $E^2$ being provided at its upper end with a tube I which extends upward above the member G. This forms a connection with the pressure gauging means to be later described.

With the construction as thus far described, it will be understood that the porous specimen to be tested, such as J, is inside of a tube $J^1$ which later has a downwardly extending portion adapted to be sleeved over the portion $E^2$ of the head E and sealed thereto by the ring F. This portion $J^1$ also forms an air chamber $J^2$ above the head E and metering member G. Thus the air pressure in this chamber will be determined by the relative rate of air flow through the metering orifice $G^1$ and rate of discharge through the sample J. This pressure may be indicated by any suitable gauge, calibrated to convert the same into permeability units, but I preferably use the following construction.

A suitable pressure measuring device K, such as a manometer, is provided, and comprises a hollow base $K^1$ and an upwardly extending plate portion $K^2$ for the mounting of a transparent gauge tube L. This tube preferably occupies a vertically extending groove $K^3$ in the plate $K^2$ and is connected to lugs $K^4$ and $K^5$ at the upper and lower ends. The lower lug $K^5$ has a passageway therein connecting with the chamber within the hollow base portion $K^1$ and extending upward to connect with the tube L. A suitable gasket $L^1$ seals the connection between the lug $K^5$ and tube while the upper end of the tube is mechanically connected with the lug $K^4$ with an air vent formed by a perforated screw $L^2$ and a gasket $L^3$.

The pressure measuring device may be placed in any suitable location above the base A but preferably it is mounted on a column M by means of a bracket $M^1$ extending rearwardly from the plate $K^2$. The bracket is pivotally attached to the column but is normally held stationary by a clamping screw $M^2$. Thus the plate $K^2$ may be inclined to facilitate reading and also for adjusting the relation of the calibrations to the liquid levels as will be later described. The chamber within the hollow base $K^1$ has a quantity of water or other liquid therein, and above the water is an air chamber which is connected with the channel $E^4$ by means of a conduit N. The level of the water in the chamber is adjacent the lower end of the tube L and at the zero marking of the calibrations O which indicate the varying heights of water raised in the tube by air pressure. Inasmuch as the contact surface of air and water within the chamber $K^1$ is relatively large with respect to the cross-sectional area of water within the tube, there will be only negligible variations in the height of this surface. Consequently, the height of water in the tube measures the air pressure within the chamber $J^2$. To convert this into permeability units, a revoluble disc Q is pivotally mounted on the portion $K^2$ by a bracket P. The bracket is located so that the pivot is at the highest level of liquid within the tube L which corresponds to zero permeability, or in other words, it corresponds to the highest air pressure that may be produced by the fan within the chamber $J^2$ if completely sealed. The disc is formed of transparent material so that the height of liquid within the tube may be observed therethrough. It is provided with a spiral line S thereon, which starting from the pivot extends around through a complete revolution and to a point slightly above the zero marking of the tube scale. Along the spiral are calibrations in permeability units and there are preferably two sets of calibrations on opposite sides of the spiral for use with different metering units.

The fan for propelling the air may be either of a single stage or multi-stage construction, but as illustrated, it is two-stage. When driven by the motor it will deliver air through the metering unit at a substantially constant volumetric rate unaffected by variations of the fan. Thus it takes the place of larger and more complex devices which have heretofore been used for the same purpose.

In use, the operator places a sample or specimen of the material to be tested within a tube $J^1$. The tube is sleeved upon the portion $E^2$ of the head E and sealed by the gasket F. When the motor is started air delivered through the metering member G will enter the chamber $J^2$ from which it can only escape through the sample J. Thus, the pressure in the chamber $J^2$ is inversely proportional to the permeability of the sample resulting in a corresponding rise of water in the tube. The operator may then manually rotate the disk Q until the spiral line is at the height of the liquid and can then take a reading as to permeability.

In the calibration of the pressure measuring device great accuracy would be required to obtain exact correspondence with the liquid levels in the tube which indicate degrees of permeability. I have devised a simple way of obtaining this exact correspondence without the necessity of such great accuracy in the calibrations. This is accomplished by mounting the pressure measuring device so as to be tiltable. Thus as the air pressure is counterbalanced by the vertical height of liquid in the tube above the liquid level in the chamber $K^1$, it is obvious that if the pressure measuring device is tilted it will change the relation between the calibrations thereon and the liquid heights in the tube. Consequently, if the calibrations do not exactly correspond to the liquid heights which they designate, this can be corrected by changing the angle of inclination with respect to the vertical. In other words, if the plane of the tube and of the calibrations therefor is inclined at a greater angle to the vertical, the spacing of the calibrations will be diminished with respect to the spacings of liquid levels. On the other hand, if adjustment of the plane is towards the vertical, there will be an increase in the spacings of the calibrations with respect to liquid levels. Such adjustment may be accomplished by loosening the clamping screw $M^2$ and tightening same after adjustment is made.

What I claim as my invention is:

1. A permeability measuring instrument of the type adapted to test a specimen within a test tube comprising a base, a motor driven air pressure fan mounted on said base and having an upwardly extending discharge conduit, a head mounted on said discharge conduit having a cylindrical portion for fitting within an end portion of said test tube, and a gasket for sealing the cylindrical portion to the end portion of said tube, said head being also provided with a restricted metering orifice for the air current, a pressure measuring device also mounted on said base having a hollow lower portion for containing liquid with an air chamber thereabove, a gauge tube extending upward from the liquid containing portion, the area of contact between the liquid and air being relatively large with respect to the cross-section of said gauge tube, an air connection between the space within said test tube above said head and said air chamber, and a disk rotatively adjustably mounted in a plane adjacent to said gauge tube having a spiral line calibrated in units of permeability registrable with the heights of liquid in said gauge tube.

2. The construction as in claim 1 in which the mounting for said pressure measuring device permits of tilting the same to change the angle of the plane of said disk and gauge tube with respect to a vertical plane.

3. The construction as in claim 1 in which said fan is multi-stage to increase the pressure of air discharged therefrom.

References Cited in the file of this patent

UNITED STATES PATENTS

| Number | Name | Date |
|---|---|---|
| 1,255,063 | Stevens | Jan. 29, 1918 |
| 1,268,292 | Stancliffe | June 4, 1918 |
| 2,194,891 | Dietert | Mar. 26, 1940 |
| 2,355,858 | Hahn et al. | Aug. 15, 1944 |
| 2,521,079 | Morris | Sept. 5, 1950 |